United States Patent [19]

Henckens et al.

[11] 4,263,267
[45] Apr. 21, 1981

[54] PROCESS FOR THE PRODUCTION OF NITRIC ACID

[75] Inventors: Arnold Henckens; Erich Scheibler, both of Dortmund, Fed. Rep. of Germany

[73] Assignee: Uhde GmbH, Dortmund, Fed. Rep. of Germany

[21] Appl. No.: 84,670

[22] Filed: Oct. 15, 1979

[30] Foreign Application Priority Data

Nov. 14, 1978 [DE] Fed. Rep. of Germany ....... 2850054

[51] Int. Cl.³ ............................................. C01B 21/40
[52] U.S. Cl. ..................................... 423/393; 423/396
[58] Field of Search ................ 423/392, 393, 394, 396

[56] References Cited

U.S. PATENT DOCUMENTS

| 1,735,342 | 11/1929 | Taylor | 423/392 |
| 2,098,953 | 11/1937 | Christensen | 423/392 |
| 3,716,625 | 2/1973 | Oberste-Berghaus et al. | 423/392 |
| 4,064,221 | 12/1977 | Rodrigo et al. | 423/394 |
| 4,183,906 | 6/1980 | Watson et al. | 423/392 |

FOREIGN PATENT DOCUMENTS

| 2219113 | 9/1974 | France | 423/392 |
| 6155 | of 1908 | United Kingdom | 423/394 |

Primary Examiner—G. O. Peters
Attorney, Agent, or Firm—Wilson, Fraser, Barker & Clemens

[57] ABSTRACT

The invention relates to a process for the production of nitric acid with a concentration of 50–65% by weight by compression of a reaction gas and its absorption in water, said reaction gas originating from an ammonia combustion process, containing nitrogen oxides and being under pressure. The nitric acid produced by the process according to the invention is particularly suitable for further processing to fertilizer.

3 Claims, 2 Drawing Figures

PROCESS FOR THE PRODUCTION OF NITRIC ACID

BACKGROUND OF THE INVENTION

In processes of the above type for the production of nitric acid, it is necessary to prevent or at least suppress undesirable side reactions of the reactants or to remove unwanted by-products in a manner that causes the least disturbances and to minimize material and energy requirements or to compensate them against each other.

For the production of nitric acid from reaction gas originating from an ammonia combustion unit, plants of the so-called "dual pressure" type are known, in which the combustion takes place at a pressure of about Pabs=2-7 bar and the absorption at about Pabs=8-20 bar. Such dual pressure plants are characterized by a high $NH_3$ yield, low platinum losses and long operating periods of the combustion unit on the one hand, and by a high degree of oxidation and low reaction volume in the absorption unit on the other hand. However, dual pressure plants require a gas compressor between the combustion and absorption units for raising the pressure of the combustion gases. The hot reaction gas from the combustion unit is cooled by known means in heat exchangers for steam generation, tail gas preheating and in water coolers to about 50° C. before being fed to the suction side of the gas compressor where the pressure is raised to the particular operating pressure selected for the downstream absorption unit. Although such dual pressure plants frequently represent the best solution from the economic point of view, certain risks are involved as regards the reliability and safety of the plant. Thus, chemical side reactions between unreacted ammonia from the ammonia combustion unit with nitrogen oxides result in the formation of ammonium salts in the reaction gas. The ammonium salts tend to settle in the suction nozzle of the gas compressor and in the compressor itself, one of the results of this being higher driving power requirements. Even if this fact can be tolerated as an unavoidable phenomenon, these deposits also constitute an increased safety risk due to the explosion hazard.

In the event of an explosive decomposition of the ammonium nitrate, which is quite likely to occur, and in case of ammonium nitrate deposits which could happen during the start-up phase, this risk is considerably greater, since not only can the compressor and other equipment be damaged beyond repair, but personnel may also suffer injuries.

As no means could be found to prevent such deposits, measures have to be taken for their removal. The gas compressor is equipped with facilities for injecting water continuously or at intervals. Although the deposited matter is easily soluble in water, it is still impossible to remove all the deposits because the complicated geometry of the compressor casing prevents the water from reaching all parts of the compressor. Moreover, the injection of water poses certain problems, such as erosion in the gas ducts, sudden changes of the casing temperature, and the premature formation of nitric acid which will evaporate on entering the subsequent compressor stages thus causing corrosion.

SUMMARY OF THE INVENTION

The aim of the invention is to prevent deposits of ammonium salts in the NO gas compressor and the associated unreliability of the compressor.

According to the invention, the aim is achieved by feeding the cooled reaction gases from an ammonia combustion unit to a first absorption stage, by raising the pressue of the output gases from the first absorption stage by a factor of at least 1.8, by feeding this compressed gas to a second absorption stage in the high-pressure absorption column, by cooling the bottom product from the first absorption stage by heat exchange against the tail gas from the second absorption stage and feeding the cooled bottom product from the first absorption stage to the acid degassing section and by feeding the acid condensate from the final reaction gas cooler to the top of the first absorption stage together with all or part of the bottom product from the second absorption stage.

The particular advantages achieved by the invention are that the ammonium nitrate and ammonium nitrite contained in the reaction gas from the ammonia combustion unit are washed out by the raw acid in the first absorption stage upstream of the NO gas compressor. The gas entering the NO gas compressor is thus free of ammonium nitrate and nitrite and no deposits can occur in this multi-stage compressor.

An additional advantage is gained in connection with energy requirements. As the nitrogen oxides that were contained in the raw acid in dissolved state are no longer passed through the NO gas compressor, less driving power is required.

As a result of the partial absorption of the nitrogen oxides in the first absorption stage and the cooling of the gases taking place there with condensation of water associated with this, the NO gas quantity is reduced to 92% of the original gas quantity, thus further reducing the driving power required for the NO compressor. This means that the total reduction of the driving power for the NO compressor can amount to 15% in consideration of all changes but at constant conditions downstream of the air compressor and upstream of the tail gas turbine.

The lower dew point of the NO gas downstream of the compressor causes a reduction of the corrosion rate in the equipment between the NO compressor and second absorption stage. The dew point shift enables the sensible heat to be utilized for tail gas preheating at lower NO gas temperatures. As the quantity of NO gas downstream of the compressor is almost equal to the quantity of tail gas, no further cooling of the NO gas by means of an additional cooler is necessary, such as would be required in a conventional plant, nor is it necessary to preheat the tail gas by means of secondary air.

BRIEF DESCRIPTION OF THE DRAWINGS

An example of the process according to the invention is illustrated in FIG. 1 and is described below.

DESCRIPTION OF THE PREFERRED EMBODIMENT

Figure 1:
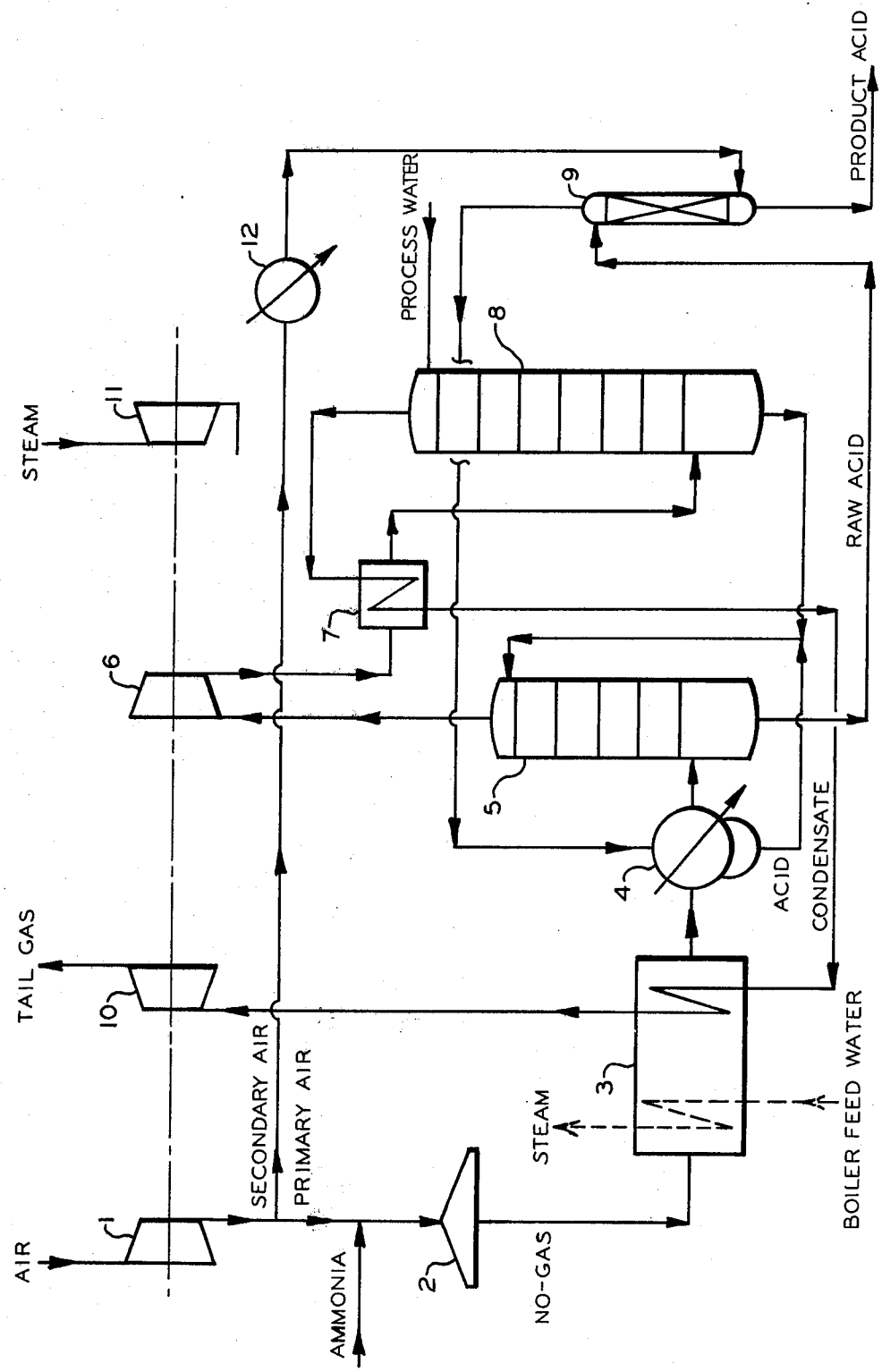

The air leaving air compressor 1 at a pressure of 5.7 bar is divided into a primary air and a secondary air stream. Ammonia is admixed to the primary air and this mixture is burnt in combustion reactor 2 in the presence of platinum/rhodium gauzes to NO-bearing gas. The sensible heat content of the NO-bearing gas is utilized to a large extent for generating steam and for tail gas preheating in heat exchanger section 3. Further cooling of the NO-bearing gas then takes place in water-cooled gas cooler 4, which is simultaneously fed with the exhaust air from the acid degassing unit. Acid condensate precipitates in gas cooler 4 by virtue of the temperature dropping below dew point. On its further way towards conversion to nitric acid, the cooled NO-bearing gas then enters the first absorption stage, namely the medium-pressure absorption column 5, through which it flows in the known manner.

The major portion of the nitrogen oxides contained in the tail gas is absorbed, ammonium nitrate and nitrite are washed out and the gas is fed to NO gas compressor 6 where it is compressed to about 12 bar.

The hot gas leaving the NO gas compressor, the heating being the result of compression, is cooled in tail gas preheater 7 before entering the second absorption stage, i.e., high pressure absorption column 8. The nitrogen oxides are absorbed here by counter-current process water flowing through the column from top to bottom, such that the residual $NO_x$ content of the tail gas is below the maximum permissible level. The tail gas leaves the high-pressure absorption column at the top and is then heated in tail gas preheater 7. The product leaving high-pressure absorption column 8 and the acid condensate from gas cooler 4 are fed to medium-pressure absorption column 5.

The bottom product of medium-pressure absorption column 5 is raw acid which is then purified to the required product specification in acid degassing unit 9 by means of secondary air introduced from below. The secondary air, which had been heated by compression, is first cooled in air cooler 12. As already mentioned, the exhaust air from the acid degassing unit is fed to gas cooler 4 or admixed to the NO-bearing gas upstream of the gas cooler.

Having been heated in the tail gas preheater and in heat exchanger section 3, the tail gas is passed through tail gas turbine 10 which it leaves as a waste gas with NO concentrations that are within the statutory limits. It is finally discharged through a stack.

Air compressor 1, tail gas turbine 10, NO gas compressor 6 and steam turbine 11 normally constitute a common assembly. In view of the fact that the steam required by the steam turbine is less than the amount of steam generated in the heat exchanger section, the excess steam can be exported and thus appears in the cost calculation as a credit.

The following numerical example compares the data for a nitric acid plant according to the invention with the data for a conventional plant.

EXAMPLE

Plant for the production of 647 tons $HNO_3$ (100%) per day in the form of acid with a concentration of 60% by weight.

| Local conditions: | |
| --- | --- |
| Air pressure: | 760 mm Hg |
| Air temperature: | 20° C. |
| Relative air humidity: | 70% |
| Cooling water temperature: | 24–34° C. |
| $NO_x$ content of tail gas: | 150 ppm $NO_x$ |
| Generated steam: | 40 bar, 400° C. |
| Turbo-compressor drive: | tail-gas and steam turbines |

Figure 2:
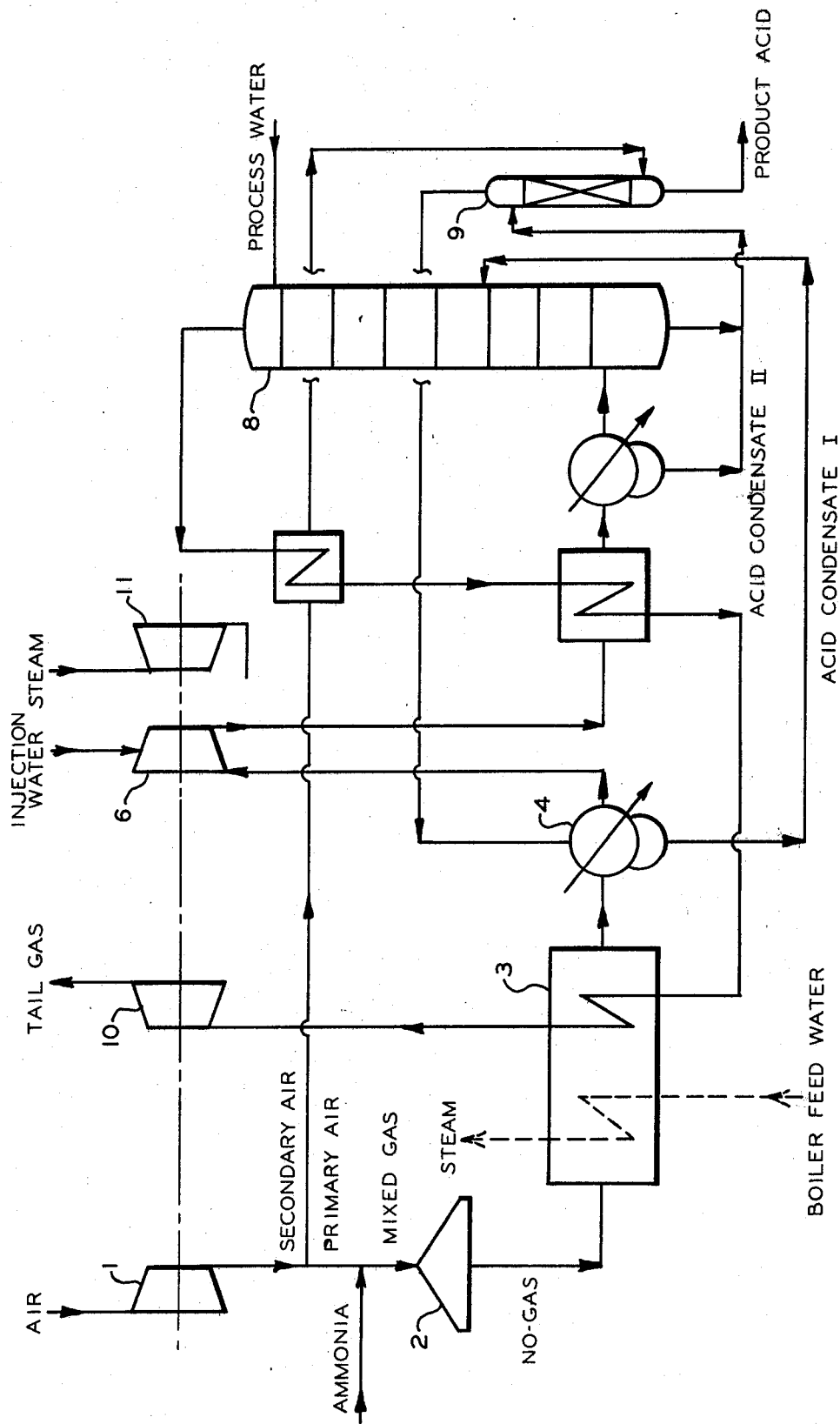
FIG. 2 is a diagram of the conventional process.

| Local conditions: | |
| --- | --- |
| Case a: | Process according to the invention as illustrated in FIG. 1. |
| Case b: | Conventional process as illustrated in FIG. 2. |

Only those parameters are shown that deviate between the two cases; the air compressor and tail gas turbine conditions are identical.

| Parameter | dimen. | case a | case b |
| --- | --- | --- | --- |
| Air compressor discharge pressure | bar | 5.69 | 5.69 |
| NO compressor intake pressure | bar | 5.10 | 5.25 |
| NO compressor discharge pressure | bar | 11.70 | 11.82 |
| Tail gas turbine inlet pressure | bar | 10.99 | 10.99 |
| NO compressor intake temperature | °C. | 40 | 63 |
| Molar stream through NO compressor | kmol/h | 3904 | 4272 |
| NO compressor driving power requ. | kW | 3386 | 3860 |
| Steam turbine output (drive) | kW | 4651 | 5125 |
| Steam consumption of steam turbine | kg/h | 19069 | 21013 |
| Steam exported from nitric acid plant | kg/h | 12103 | 10159 |
| Dew Point of NO gas downstream of NO compressor without water injection | °C. | 36 | 55 |
| with water injection | °C. | — | 65 |
| Number of absorption columns | — | 2 | 1 |
| Total absorber volume | m³ | 363 + 587 | 670 |
| Heat exchange surfaces | m² | 1203 | 1525 |

From the above table it can be seen that the capital investment required for either case is virtually identical, whereas the energy requirements are considerably less in case a. The loss of NO compressor efficiency in a conventional plant due to deposits accumulating in the compressor has not been taken into consideration.

We claim:

1. A process for the production of nitric acid with a concentration of 50–65% by compression of reaction gases and their absorption in water, said reaction gases originating from an ammonia combustion process, containing nitrogen oxides, and being under pressure, said process comprising:
   (a) cooling said reaction gases by passing them through a gas cooler and feeding the cooled reaction gases to a first absorption stage without substantial further compression,
   (b) raising the pressure of the gases leaving said first absorption stage by a factor of at least 1.8,
   (c) feeding the compressed gases leaving said first absorption stage to a second absorption stage after the gases have been cooled by heat exchange against a tail gas from said second absorption stage,
   (d) feeding the raw acid bottom product from said first absorption stage to an acid degassing unit to degas it,
   (e) feeding the acid condensate from said gas cooler to adjacent the top of said first absorption stage together with at least part of the bottom product from said second absorption stage, and
   (f) recovering the acid product from the bottom of said degassing unit.

2. The process of claim 1 in which said gases fed to said first absorption stage contain ammonium nitrate and ammonium nitrite, and said ammonium nitrate and nitrite are washed out of said first absorption stage as a bottom product in step e by said acid condensate from said gas cooler and by said at least part of the bottom product of said second absorption stage, thereby preventing said ammonium nitrate and nitrite from leaving said first absorption stage with rising gases passing to a compressor and avoiding depositing said ammonium nitrate and nitrite in such compressor.

3. The process of claim 1 including passing water downwardly through said second absorption stage to absorb nitrogen oxides and place the residual $NO_x$ content of rising tail gas leaving said second absorption stage below a maximum permissible level.

* * * * *